(12) United States Patent
Yang et al.

(10) Patent No.: US 6,844,096 B2
(45) Date of Patent: Jan. 18, 2005

(54) EASY REFUELLING METAL-GAS CELL BATTERY WITH SOFT POCKET

(75) Inventors: De-Qian Yang, Diamond Bar, CA (US); Richard Yang, Diamond Bar, CA (US)

(73) Assignee: GreenStar Corp., City of Industry, CA (US)

(*) Notice: Subject to any disclaimer, the term of this patent is extended or adjusted under 35 U.S.C. 154(b) by 314 days.

(21) Appl. No.: 10/231,878

(22) Filed: Aug. 28, 2002

(65) Prior Publication Data

US 2003/0003338 A1 Jan. 2, 2003

Related U.S. Application Data

(63) Continuation-in-part of application No. 09/681,260, filed on Mar. 9, 2001, now abandoned, and a continuation-in-part of application No. 09/682,012, filed on Jul. 9, 2001, now abandoned, and a continuation-in-part of application No. 09/683,120, filed on Nov. 20, 2001, now Pat. No. 6,630,262.

(51) Int. Cl.[7] .......................... H01M 2/08; H01M 2/10; H01M 2/18

(52) U.S. Cl. .......................... 429/28; 429/35; 429/136; 429/139; 429/208

(58) Field of Search ................ 429/27, 28, 34–36, 429/136, 139, 137, 208, 229

(56) References Cited

U.S. PATENT DOCUMENTS

| | | | | |
|---|---|---|---|---|
| 4,950,561 A | * | 8/1990 | Niksa et al. | 429/27 |
| 5,616,434 A | * | 4/1997 | Redden et al. | 429/136 |
| 5,650,241 A | * | 7/1997 | McGee | 429/67 |
| 5,904,999 A | * | 5/1999 | Kimberg et al. | 429/27 |

* cited by examiner

Primary Examiner—Patrick Ryan
Assistant Examiner—Tracy Dove
(74) Attorney, Agent, or Firm—Thomas, Kayden, Horstemeyer & Risley

(57) ABSTRACT

A metal-gas cell battery, such as a zinc-air cell battery, has one or more metal-gas cells. Each metal-gas cell has a metal anode sandwiched between a pair of gas cathodes. Each gas cathode is disposed within a rigid retaining structure. An expandable soft pocket for holding an electrolyte connects the two retaining structures. The anode is disposed within the soft pocket without being enclosing by a separator bag. The cell is mechanically refueled by expanding the soft pocket to allow replacing easily a spent anode with a fresh anode.

70 Claims, 7 Drawing Sheets

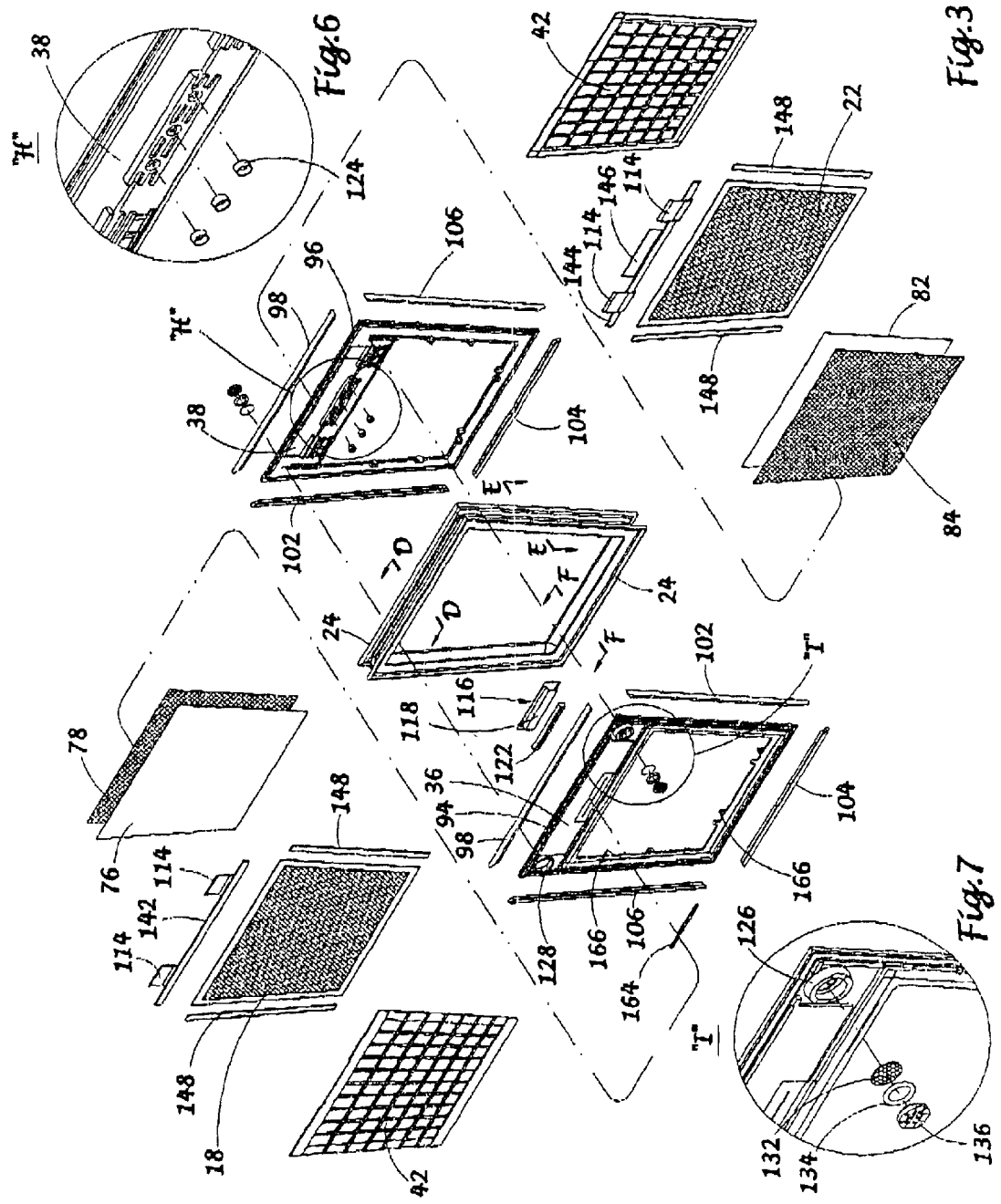

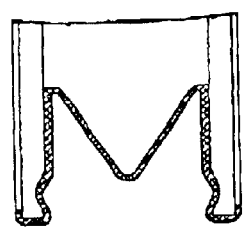
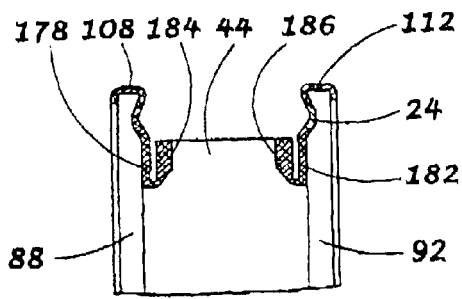
Fig. 5          Fig. 4
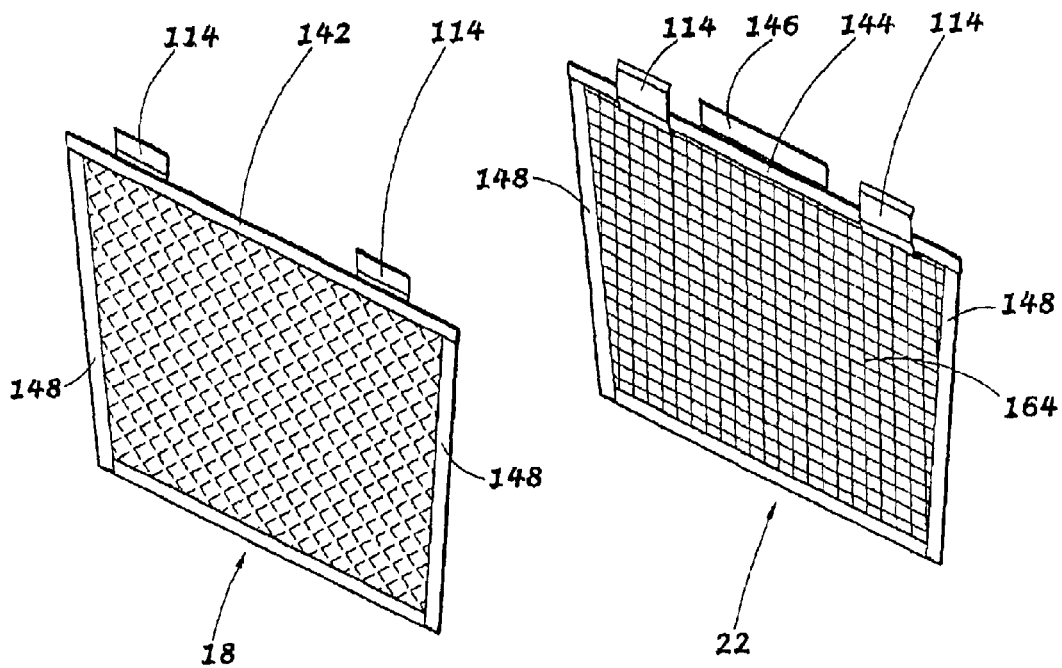
Fig. 8

EASY REFUELLING METAL-GAS CELL BATTERY WITH SOFT POCKET

CROSS-REFERENCE TO RELATED APPLICATION

This application is a continuation-in-part of U.S. application Ser. No. 09/681,260, filed Mar. 9, 2001 now abandoned under the title of "Metal-Gas Cell Battery with Soft Pocket", U.S. application Ser. No. 09/682,012, filed Jul. 9, 2001 now abandoned under the title of "Metal-Gas Cell Battery with Soft Pocket, and U.S. application Ser. No. 09/683,120, filed Nov. 20, 2001 now U.S. Pat. No. 6,630,262 under the title of "Metal-Gas Cell Battery with Soft Pocket, the full disclosures of which are incorporated herein by reference.

BACKGROUND OF THE INVENTION

1. Field of Invention

The present invention generally relates to metal-gas cell batteries, such as metal-air cell batteries. More particularly, the present invention relates to mechanically rechargeable metal-air cell batteries.

2. Description of Related Art

More powerful and longer-lasting batteries are a high priority item for all countries seeking to replace hydrocarbon-fueled vehicles with smogless electrically powered vehicles. A great deal of research is thus presently focused on metal-gas cell batteries, such as zinc-air batteries. Zinc-air batteries have the highest theoretical specific energy content of all known battery types. Many problems, however, must be overcome before vehicles powered by zinc-air batteries, which are regarded as acceptable alternatives to vehicles burning hydrocarbon fuel.

All metal-gas cell batteries comprise a plurality of cells. Each of the cells has at least a gas cathode and a metal anode separated by a quantity of alkaline electrolyte and some form of mechanical separator sheet. During the operation of metal-gas cell batteries, a reactant gas, such as oxygen, reacts at each gas cathode to form hydroxide ions, and these hydroxide ions, in the alkaline electrolyte, react with metal anode material at each metal anode. The process creates an electrical potential between each gas cathode and each metal anode. When the cells are connected in series, the combined electrical potential of all cells is considerable and can be used as a source of electrical power. As can be seen, however, the operation of the battery gradually depletes the available metal anode material. Therefore, the battery has to be periodically recharged.

Metal-gas cell batteries can be recharged either electrically or mechanically. Electrical recharging can be easily adapted to the existing power networks, but the service life of the electrically rechargeable metal-gas battery is markedly limited. Moreover, an electrically rechargeable metal-gas battery requires a bifunctional or an additional gas diffusion electrode. Due to the need for such a bifunctional or additional gas diffusion electrode, the battery is unduly heavy, bulky and complicated.

Accordingly, the current preferred recharging mode for metal-gas cell batteries is mechanical refueling, whereby the spent metal anode is physically replaced with a fresh metal anode. Mechanical refueling can be accomplished in two ways. When the metal anode comprises metallic pellets or powder suspended within the electrolyte, the spent metallic pellets or powder is pumped from the cell and fresh metallic pellets or powder is pumped into the cell. U.S. Pat. Nos. 3,981,747, 5,006,424, 5,434,020 and 5,558,947 disclose attempts to use zinc particles or pellets as anodes.

An even simpler method of mechanical refueling is possible if the metal anode is a rigid structure, for example, made of a conductive support packed with zinc powder. The spent metal anode is removed and a fresh metal anode is reinstalled into the cell. This refueling method is generally employed because of its theoretical, construction, maintenance and operation simplicity. U.S. Pat. Nos. 3,513,030, 5,208,526, 5,318,861, 5,366,822, 5,418,080, 5,447,805, 5,753,384, 5,904,999 and 6,057,052 all disclose various methods of mechanically refueling metal-gas cell batteries by replacing the spent rigid anode structure. Each of the patents listed is incorporated herein by reference in its entirety.

One problem with such conventional metal-gas cell batteries is that the rigid anode structures are difficult to remove from and insert into the cell. In a conventional cell where the housing of the cell is wholly rigid, clearances for the removal and reinsertion of such anodes are generally very small. The gas cathodes and separator sheets are often abraded during the removal and reinsertion of the anodes. U.S. Pat. Nos. 4,389,466 and 4,560,626 disclose an attempt to solve this problem. However, in these patents, the total contact area between the cone-shaped current collectors and the metal anodes of the metal-gas cell batteries is not sufficiently large for large currents. Moreover, pinpoints on the current collectors often make the insertion and extraction of the metal anodes very difficult. Another attempt to solve this problem is disclosed in U.S. Pat. No. 5,286,578. In this patent, a collapsible electrochemical cell made by "a flexible plastic material" is suggested to satisfy its collapsible design. No detail of the flexible plastic material is disclosed. However, such housing system is fragile and cannot withstand repeated refueling. Other wholly flexible housing systems are disclosed in U.S. Pat. Nos. 5,415,949 and 5,650,241. Such housing systems are unduly complex and are therefore expensive to manufacture, maintain and operate.

U.S. Pat. Nos. 4,389,466 and 4,560,626 disclose a soft bladder to press the zinc anode against the multi-points and cone-shaped current collector. These designs have many problems and are not discussed here. In fact, no commercial product on the market comes even close to the designs described in these patents. Another problem with metal-gas cell batteries, which are mechanically refueled by physical replacement of a rigid anode structure, is the frequent leakage of the alkaline electrolyte. In most prior art designs, the housing of the metal-gas cell is usually opened at the top. The opening is sealed during operation by an elastic sealing element disposed between the cell housing and a protruding portion of the anode assembly. This protruding portion of the anode assembly is universally used in such designs for electrical connection to other battery electrodes. Moreover, it is common to provide one or two small breathing holes along the uppermost portion of the cell proximal to the protruding portion of the anode. However, alkaline electrolyte tends to creep up the anode and out of the cell along the protruding portion of the anode. Also, alkaline mist continuously escapes through the breathing holes. Such leakage and mist can cause rapid oxidation of the conductors of the anode and the air cathode. Oxidation dramatically increases the electrical resistance between the contact surfaces and therefore results in a marked loss of battery power. Moreover, the continual leakage of alkaline electrolyte and electrolyte mist makes the battery difficult to use in any kind of environment where oxidation of metallic items outside the battery is a problem. Finally, any upset of the battery during handling or operation will cause copious leakage of alkaline electrolyte out of the battery.

As a matter of fact, secondary zinc-air fuel cells or batteries, no matter whether mechanically refuelable or electrically rechargeable, have not been manufactured on a large scale as a commercial product. Only primary zinc-air button cell and zinc-air battery, which are not rechargeable, for navigation lamps can be found on the market at present. This is because no one has yet solved the problem of the separator.

All the secondary zinc-air batteries having zinc electrode suffer from a short service life because the batteries are short-circuited by zinc dendrites growing from the zinc electrode during recharging. The sharp zinc dendrites stab the separator like needles and bridge the zinc anode to the air cathode. Therefore, short circuits often occur, Batteries like Ni—Zn battery, Ag—Zn battery and the electrical rechargeable zinc-air fuel cells have the same serious problems due to frequent recharging. Theoretically, the mechanically refuelable secondary zinc-air fuel cell should not suffer from this problem, as it is not electrically recharged. However, the mechanically refuelable zinc-air fuel cells do suffer this problem, although with lesser frequency. Even at a lesser frequency, it is still a serious problem, as when even one cell in a multi-cell module is short-circuited, the whole module fails.

The principle by which unpredicted zinc dendrites occasionally grow and cause short circuits is not clear yet, but may be due to the following reason. During the discharge of the uneven density of the zinc powder distribution on the anode plate, the electrical potential is different on different location of the zinc electrode. As a result of reducing zincates in the alkaline electrolyte to deposit metal zinc on the zinc anode surface, the zinc dendrites are formed at lower potential locations of the zinc electrode. These dendrites rapidly span the narrow gap between the anode and the cathode to short the cell. Therefore, the previous art designs either cannot avoid occasional short circuits or sacrifice significantly the performance of the cell.

To avoid the zinc dendrites causing short circuits, in the traditional zinc-air battery used for powering a navigation lamp, the zinc electrode is usually wrapped in multiple layers of separator paper to enhance resistibility thereof stabbing by zinc dendrites. Additionally, the distance from the air cathode to the zinc anode is enlarged to about 10 mm or more, so that the zinc dendrites cannot grow long enough to reach the air cathode. As the result of increasing the electric resistance of the multiple layers of separator paper and the thickness of the electrolyte, the internal resistance of the cell is increased, too. Hence, this kind of zinc-air battery can only deliver low power; it is enough to power a navigation lamp or a communication equipment unit, but not adequate to power an electric vehicle.

Mechanically refuelable secondary zinc-air fuel cells are expected to have a service life that is a few hundred times longer than the disposable zinc-air fuel cells. The separator is too expensive to be renewed during every refueling; the separator has to be reusable over the whole service life of the zinc-air fuel cells. U.S. Pat. No. 5,418,080 discloses a 400-mesh fabric separator bag employed in a zinc-air fuel cell. This separator bag is made of polypropylene fabric or polymeric amide and is expected to be strong enough to work in an alkaline electrolyte for several years. But the separator bag needs to be slipped onto the zinc anode plate and has to be washed after every discharge. Otherwise, zinc oxide residue tends to block the pores of the fabric as well as the transfer of ions, which ions would otherwise penetrate the pores of the fabric to transfer electricity between the cathode and the anode. As a result, the output power is lowered from time to time. U.S. Pat. No. 5,431,823 also discloses a specially designed tool for washing the separator bag. Even with this specially designed washing tool, the separator bags have to be manually slipped onto and removed from the washing tools. Besides, the separator bags have to be manually slipped onto and removed from the zinc anodes as well. If the huge quantity of anodes and separator bags when hundreds of thousands of zinc-air fuel cells are in use is considered, this labor-intensive processing is obviously too expensive to be a real commercial solution, even in developing countries.

Furthermore, although by visual observation, the 400-mesh fabric is a fine and close texture, its openings are too large to prevent the zinc dendrites from passing through. Therefore, the short circuit caused by zinc dendrites cannot be avoided for sure.

Kummrow's zinc-air battery uses fabric as the separator bag, too. Slightly differing from U.S. Pat. No. 5,418,080, it uses a thicker fabric. In order to prevent short circuits caused by zinc dendrites, a polypropylene box with big holes on its two major surfaces is used to envelop the zinc anode and its separator bag. Therefore, it entails not only the expensive, labor-intensive operation of changing and washing the separator bags, but also the additional changing and washing the polypropylene boxes. Furthermore, the gaps between the zinc anodes and the air cathodes are increased to about 10 mm. This construction may not suffer from short circuits caused by zinc dendrites, but the power output is significantly reduced. It may suitable for low power use, but definitely is not suitable for high power requirements, such as electric vehicles.

From the commercial point of view, the expensive labor-intensive operation of changing and washing the separator bags has to be eliminated; the separator has to be installed permanently in the zinc-air fuel cell. Consequently, none of the existing constructions solves the problem caused by zinc dendrites short circuits.

Another serious problem arises when the separator is permanently installed in the zinc-air fuel cell. The pores of the separator are passages for the hydroxide ions. If the pores are blocked by zinc oxide, the hydroxide ions are blocked, too. Hence the zinc anode will be hungry from lack of hydroxide ions, and the power output will decrease over time as the openings of the separator are increasingly blocked. Even when the discharging current is turned off, the pores of the micro-porous separator are plugged by the precipitation of zincates to zinc oxide from the electrolyte.

The separator is one of the keys to the performance and durability of the secondary zinc-air fuel cells and batteries. The separator's ability to control the exchange of ions plays a limiting role in determining maximum power to weight ratio; this is especially important for the zinc-air fuel cells for powering electric vehicles.

Attempts to avoid the dendrite-shorting problem using metal or metal oxide as barrier layers are illustrated in U.S. Pat. Nos. 3,539,396 and 4,298,666. Nickel powder is commonly used in these patents because it reacts with the zinc dendrites as a micro cell to prevent the continuous growing of the dendrites. Separators selected from the above patents could be the solution to the separator problem for zinc-air rechargeable battery, although they are expensive.

For mechanically refuelable zinc-air fuel cells, no matter whether its discharged anode has to be replaced or recharged in another recharging cell, the separators with metal or metal oxide barrier layer are not necessary. Separators selected from the following patents may be good enough for mechanically refuelable zinc-air fuel cells. U.S. Pat. Nos. 4,154,912, 4,272,470 and 6,033,806 disclose a graft polyvinyl alcohol separator, which may be effective to avoid dendrite short-circuiting.

In U.S. Pat. No. 4,359,510, a novel structure of separator is disclosed. A hydrophobic micro-porous non-woven web is first treated with a wet agent and then coated with cellulose on both sides. This manufactured separator has a low ionic resistance, good hydrophilic ability, dendrite-shorting resistance, and pore-plug resistance.

SUMMARY OF THE INVENTION

It is therefore an objective of the present invention to provide a metal-gas cell battery that can be conveniently recharged by mechanically replacing the metal anode.

It is another objective of the present invention to provide a metal-gas cell battery that can eliminate the expensive and labor-intensive operation of changing and washing the separator bags.

It is still another objective of the present invention to provide a metal-gas cell battery which does not leak electrolytes or electrolyte mist.

It is further another objective of the present invention to provide a metal-gas cell battery which is suitable for rapid refueling and sufficiently durable for hundreds of refueling operations.

In accordance with the foregoing and other objectives of the present invention, the invention describes a metal-gas cell battery comprising at least one metal-gas cell. Each metal-gas cell comprises the following. A first gas cathode is disposed within a rigid planar first retaining structure, The first gas cathode is permeable to air but impermeable to liquids and allows the passage of gases into the cell. A second gas cathode is disposed within a rigid planar second retaining structure. The second gas cathode is permeable to air but impermeable to liquids and allows the passage of gases into the cell. The second retaining structure is moveable with respect to the first retaining structure between a first retaining structure position, in which the second retaining structure is proximal to the first retaining structure, and a second retaining structure position, in which the second retaining structure is spaced apart from the first retaining structure. The second gas cathode is electrically connected to the first gas cathode. A soft pocket is disposed between the first gas cathode and the second gas cathode. The soft pocket has a flexible and planar first wall and a flexible and planar second wall. The peripheries of the first and the second walls have top edges. The periphery of the first wall is connected to the periphery of the second wall except along the respective top edges. The periphery of the first wall is attached to the first retaining structure, and the periphery of the second wall is attached to the second retaining structure. The first retaining structure, the first gas cathode, the first wall, the second wall, the second retaining structure and the second gas cathode together define a liquid retaining soft pocket chamber having a lower portion, an upper portion and a top opening defined between the top edges of the first and the second walls. The top opening of the soft pocket chamber is open when the first and the second retaining structures are in the second retaining structure position and tightly closed when the first and the second retaining structures are in the first retaining structure position. Finally, a soft pocket closing mechanism for securing the first and the second retaining structures is located in the first retaining structure position. A metal anode is disposed within the soft pocket chamber, and two separator sheets are permanently and respectively installed between the gas cathodes and protective meshes thereof, no matter whether a discharged anode has to be replaced or recharged in separated recharging cells.

The cell further comprises a positive battery terminal electrically connected to the first and the second gas cathodes and a negative battery terminal electrically connected to the metal anode.

In a typical embodiment of the invention, the first and the second gas cathodes are air cathodes and the metal anode is substantially made of metallic zinc.

In a preferred embodiment of the invention, the metal anode is wholly disposed within the soft pocket chamber.

In another embodiment of the invention, the metal-gas cell battery further comprises a second semi-permeable membrane disposed within the upper portion of the soft pocket chamber to reduce the pressure difference between the soft pocket chamber and the outside atmosphere.

In still another embodiment of the invention, the soft pocket can be made of any elastic material which resists deterioration from the electrolyte. These materials include neoprene, ethylene propylene diene monomer, butyl rubber, ethylene propylene copolymer, and chlorosulfonated polyethylene.

In a typical embodiment, the soft pocket comprises a molded integral piece with a M-shaped cross section.

in still another typical embodiment, the soft pocket closing mechanism comprises at least one bolt and at least one nut.

In a further embodiment of the invention, the periphery of the first wall is attached to the first retaining structure and the periphery of the second wall is attached to the second retaining structure by mechanical force and without glue.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 3 is an exploded view of the metal-gas cell (without anode) shown in FIG. 2;

FIG. 4 is a cross-sectional view taken along DD of the unfolded soft pocket of FIG. 3;

FIG. 5 is a cross-sectional view taken along EE or FF of the unfolded soft pocket of FIG. 3;

FIG. 6 is an enlarged view of encircled area "H" in FIG. 3;

FIG. 7 is an enlarged view of encircled area "I" in FIG. 3;

FIG. 8 is a perspective view of a first and a second gas cathodes useable in the cell of FIG. 2;

DESCRIPTION OF THE PREFERRED EMBODIMENTS

Figure 1:
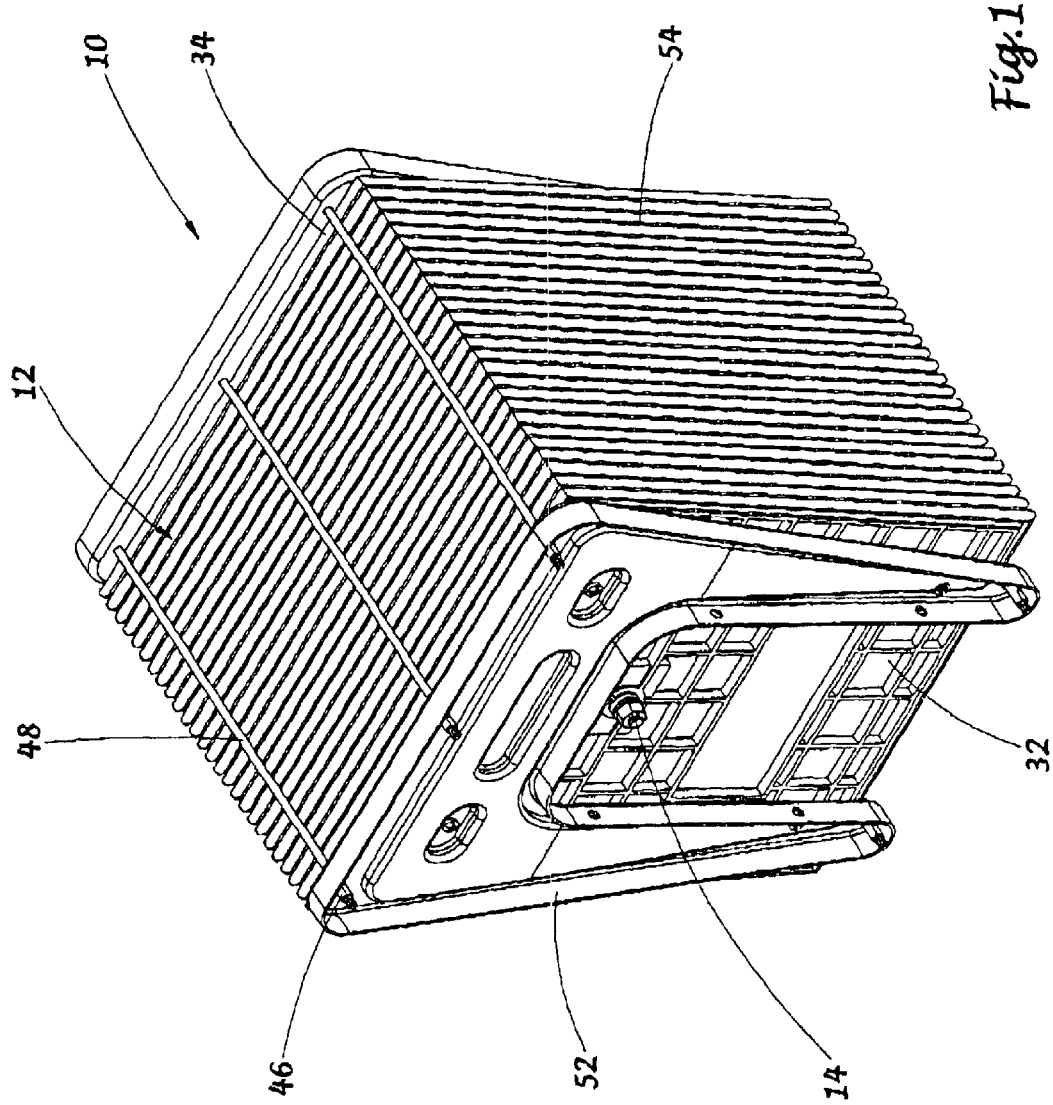
FIG. 1 is a perspective view of a metal-gas cell battery according to one preferred embodiment of the invention.

Reference will now be made in detail to the present preferred embodiments of the invention, examples of which are illustrated in the accompanying drawings. This discussion should not be construed, however, as limiting the invention to those particular embodiments. Practitioners skilled in the art will recognize numerous other embodiments as well. Wherever possible, the same reference numbers are used in the drawings and the description to refer to the same or like parts.

The function of a separator for commercial secondary zinc-air fuel cell should mechanically separate the gas cathode and the metal anode and also have the following characteristics: (1) The separators have to be absorptive and readily allow the transport of hydroxide ions to reduce the electrical resistance of the zinc-air fuel cell. (2) The separators have to be impermeable to zincates. (3) The separators have to be chemically stable in the alkaline electrolyte environment. (4) The separators have to be resistant to penetration by zinc dendrites. (5) The pores of the separators must avoid blockage by precipitation of zinc oxide. (6) The separators must last for the whole service life of the zinc-air fuel cells. (7) The separators must as cheap as possible.

In accordance with the foregoing and other needs, the invention provides a metal-gas cell battery. FIG. 1 is a perspective view of a metal-gas cell battery according to one preferred embodiment of the invention. In FIG. 1, a metal-gas cell battery 10 comprises a plurality of metal-gas cells 12 connected in series, a positive battery terminal 14 and a negative battery terminal (not shown). A reactive gas used for the cathode is oxygen, such as from air, and the anode material is zinc or similar metal. In FIG. 1, air for providing cooling and reactive oxygen to the metal-gas cell battery 10 flows through gaps 54 between the metal-gas cells 12. The number of metal-gas cells 12 of the metal-gas cell battery 10 depends upon what voltage is desired.

In FIG. 1, the metal-gas cell battery 10 comprises a front cover plate 32 and a rear cover plate 34. The front cover plate 32 protects the outermost first gas cathode 18 in the first metal-gas cell 12, and the rear cover plate 34 protects the outermost second gas cathode 22 in the last metal-gas cell 12.

Figure 2:
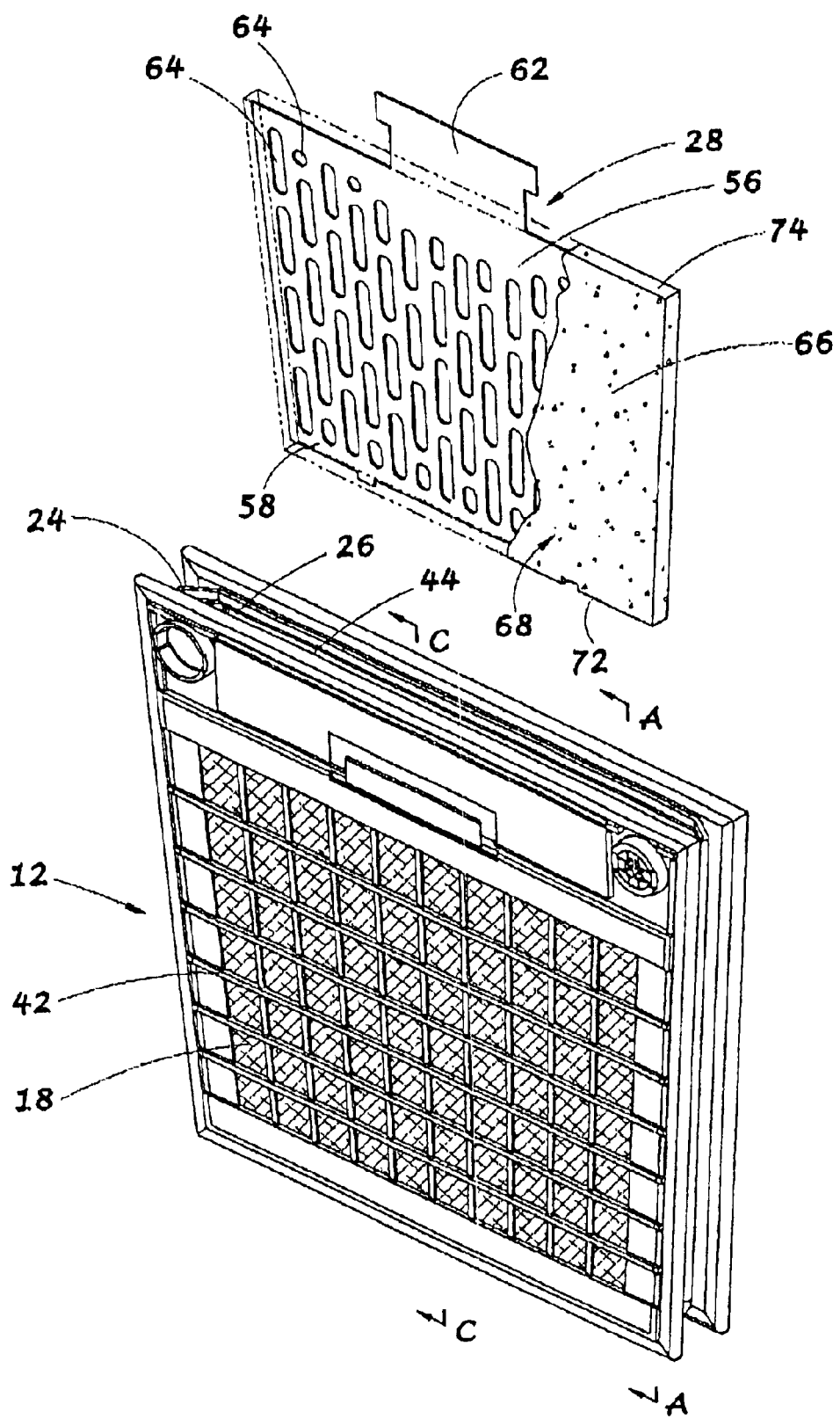
FIG. 2 is a perspective view of a metal-gas cell useable in the metal-gas cell battery of FIG. 1.

FIG. 2 is a perspective view of a metal-gas cell useable in the metal-gas cell battery of FIG. 1. In FIG. 2, the metal-gas cell 12 comprises a first gas cathode 18, a second gas cathode 22 (not shown in FIG. 2, but shown in FIG. 3) and a soft pocket 24 disposed between the first gas cathode 18 and the second gas cathode 22. The soft pocket 24 defines a soft pocket chamber 26. Each metal-gas cell 12 further comprises a metal anode 28 disposed within the soft pocket chamber 26. In a preferred embodiment, the metal anode 28 is wholly disposed within the soft pocket chamber 26.

FIG. 3 is an exploded view of the metal-gas cell (without anode) shown in FIG. 2. The first gas cathode 18 is disposed within a first retaining structure 36, which is rigid and planar. The first gas cathode 18 permeable to the reactive gas but impermeable to liquids. When the reactive gas is atmospheric oxygen, the first gas cathode 18 allows the passage of oxygen from the atmosphere into the metal-gas cell 12.

The second gas cathode 22 is disposed within a second retaining structure 38, which is also rigid and planar. The second gas cathode 22 also is permeable to the reactive gas but impermeable to liquids. When the reactive gas is atmospheric oxygen, the second gas cathode 22 allows the passage of oxygen from the atmosphere into the cell 12.

The second retaining structure 38 is moveable with respect to the first retaining structure 36 between a first retaining structure position and a second retaining structure position. The second retaining structure 38 is proximal to the first retaining structure 36 when the first and the second retaining structures 36 and 38 are in the first retaining structure position. The second retaining structure 38 is spaced apart from the first retaining structure 36 when the first and the second retaining structures 36 and 38 are in the second retaining structure position.

Both the first gas cathode 18 and the second gas cathode 22 comprise a supporting lattice structure 42 which allows sufficient air flows through the first gas cathode 18 and the second gas cathode 22.

FIG. 4 is a cross-sectional view taken along DD of the unfolded soft pocket 24 of FIG. 3. In FIG. 4, the soft pocket 24 has a top opening 44. The top opening 44 is open when the first and the second retaining structures 36 and 38 are in the second retaining structure position. The top opening 44 is tightly closed when the first and the second retaining structures 36 and 38 are in the first retaining structure position. "Be tightly closed" means that the top opening 44 is sufficiently sealed to prevent the leakage of electrolyte or electrolyte fumes from the soft pocket chamber 26 (shown in FIG. 2).

Referring to FIG. 1 again, the soft pockets 24 of the series connected metal-gas cells 12 can be closed for securing the first and the second retaining structures 36 and 38 in the first retaining structure position. In FIG. 1, the soft pocket closing mechanism can be nuts 46 and screws 48 extending from the front cover plate 32 to the rear cover plate 34 and the two outmost pi-shaped reinforced metal fittings 52.

In FIG. 1, the positive battery terminal 14 can be a male cone-shaped or cylindrical shaped structure disposed in the front cover plate 32 as illustrated in FIG. 1. The negative battery terminal (not shown) can be a corresponding female cone-shaped or cylindrical shaped structure disposed in the rear cover plate 34. The positive battery terminal 14 is electrically connected to the first and second gas cathodes 18 and 22. The negative battery terminal is electrically connected to the metal anode 28.

In FIG. 2, the metal anode 28 is wholly disposed within the soft pocket 24. The metal anode 28 comprises a support structure 56 having a support base portion 58 and a tab portion 62 above the support base portion 58. The support base portion 58 and the tab portion 62 can be made of any conductive material. Therefore, the support structure 56 is electrically conductive. Copper is preferably used for the support structure 56 because of its low cost, rigidity and high conductivity. The support base portion 58 should be rigid enough to minimize damage or distortion during recycling and provide a large cross-sectional area to allow high current flow with minimal voltage drop. In FIG. 2, openings 64 on the support base portion 58 reduce the weight of the support structure 56 and are packed with the metal powder 66 on both sides of the support base portion 58 into an integral whole.

Metal powder 66, such as zinc powder, is pressed onto the base portion 58 to form an anode base portion 68. Preferably, the openings 64 in the support base portion 58 are located and configured such that the electrical resistance between all the metal powder 66 and the support base portion 58 is nearly identical.

The anode base portion 68 is preferably planar and shaped to provide a large surface area. To facilitate the installation of the metal anode 28 into the soft pocket 24, it is also preferable that the length of the lowermost edge 72 of the anode base portion 68 be shorter than that of the uppermost edge 74 of the anode base portion 68. Thus, in a typical embodiment, the anode base portion 68 is trapezoidal in shape with the lowermost edge 72 of the anode base portion 68 being slightly shorter in length than the uppermost edge 74 of the anode base portion 68. In such embodiments, it is also typical, but not necessary, for the soft pocket 24, the first gas cathode 18 and the second gas cathode 22 to have equivalent shapes.

The tab portion 62 of the support structure 56 provides a convenient handle which is useful in the installation and removal of the metal anode 28 from the soft pocket 24. The tab portion 62 further provides an electrical connection means for the metal anode 28 as described below. In the preferred embodiments where the metal anode 24 is wholly disposed within the soft pocket 24 during operation, the tab portion 62 needs no sealing elements.

In FIG. 3, there are a few extended pieces 166 located at the inner periphery of the first and the second retaining structures 36 and 38. These extended pieces 166 are used to keep the metal anode 28 in the right position.

In FIG. 3, a separator sheet 76 is permanently installed between the first gas cathode 18 and the protective mesh 78; a separator sheet 82 is permanently installed between the second gas cathode 22 and the protective mesh 84.

In order to show clearly the construction of the soft pocket 24 in FIG. 3, cross-sectional views DD, EE and FF are shown in FIGS. 4 and 5. The M-shaped cross section shown in FIG. 5 is designed to ensure sufficient flexibility of the soft pocket 24. In FIG. 4, the soft pocket 24 has a flexible and planar first wall 178 and a flexible and planar second wall 182. The periphery of the first wall 178 has a top edge 184, and the periphery of the second wall 182 has a top edge 186. The periphery of the first wall 178 is connected to the periphery of the second wall 182 except along the respective top edges 184 and 186. The periphery of the first wall 178 is attached to the first retaining structure 36, and the periphery of the second wall 182 is attached to the second retaining structure 38. Therefore, the first retaining structure 36, the first gas cathode 18, the first wall 178, the second wall 182, the second retaining structure 38 and the second gas cathode 22 define a soft pocket chamber 26 (shown in FIGS. 2 and 9) for retaining liquid. The soft pocket chamber 26 has a lower portion 172, an upper portion 176 (shown in FIG. 9) and a top opening 44 (shown in FIG. 4). The top opening 44 is defined between the top edges 184 and 186 of the first wall 178 and the second wall 182. The top opening 44 is open when the first and the second retaining structures 36 and 38 are in the second retaining structure position and tightly closed when the first and the second retaining structures 36 and 38 are in the first retaining structure position. Any elastic material capable of resisting the electrolyte deterioration can be used to make the soft pocket 24. These materials include neoprene, PVC, ethylene propylene diene monomer, butyl rubber, ethylene propylene copolymer, and chlorosulfonated polyethylene.

The grooves 88 and 92 on the soft pocket 24 shown in FIG. 4 fit onto the periphery 94 of the first retaining structure 36 and the periphery 96 of the second retaining structure 38 (shown in FIG. 3), respectively. The four edges of both grooves 88 and 92 securely fit onto the four edges of the periphery 94 and periphery 96 and are sealed by tightly pressing the metal-fittings 98, 102, 104 and 106 (shown in FIG. 3) onto the outer surfaces 108 and 112 of the grooves 88 and 92.

In FIG. 3, the contact surfaces between the soft pocket 24 and the first retaining structures 36 as well as the second retaining structure 38 are reliably sealed by mechanical force created by the deformation of the metal-fittings 98, 102, 104 and 106, and do not rely on any kind of glue. Further, as the natural state of the soft pocket 24 is to be open, the only compression force occurs during operation. The pi-shaped reinforced metal-fittings 52 (shown in FIG. 1) are provided to create not only the contacting forces between electrical contacts 114 of the first gas cathode 18 and the second gas cathode 22 and the contacting force of the tab portion 62 (shown in FIG. 2) of the support structure 56 to the conducting surface 116 of the anode conductor 118, but also to distribute evenly the tightening force along the whole length of the top opening 44 of the soft pocket 24, so that a more reliable seal is obtained.

A rubber sealing element 122 is provided to avoid leakage of the electrolyte because the anode conductor 118 should be installed through the first retaining structure 36. Another elastic element 164 is provided to create a force to ensure good contact of the anode conductor 118 and the cathode conductor 146 of the next cell, as will be explained later.

FIG. 6 is the enlarged view of encircled area "H" of FIG. 3. Elastic elements 124 are seated in the second retaining structure 38 to press tightly the tab portion 62 (in FIG. 2) against the conducting surface 116 of the anode conductor 118 to ensure good electrical conductivity. Elastic elements 124 can be made with any elastic and alkaline-resist material, and preferably from the same material as the soft pocket 24.

FIG. 7 is an enlarged view of encircled area "I" of FIG. 3. As can be seen in the drawing, the first or the second retaining structure 36 or 38 has one raised cylinder 126 and one sunken cylinder 128 (shown in FIGS. 3 and 9). The outer diameter of the raised cylinder 126 is made to match the inner diameter of the sunken cylinder 128, so that any number of metal-gas cells 12 can be aligned to form the metal-gas cell battery 10.

Figure 9:
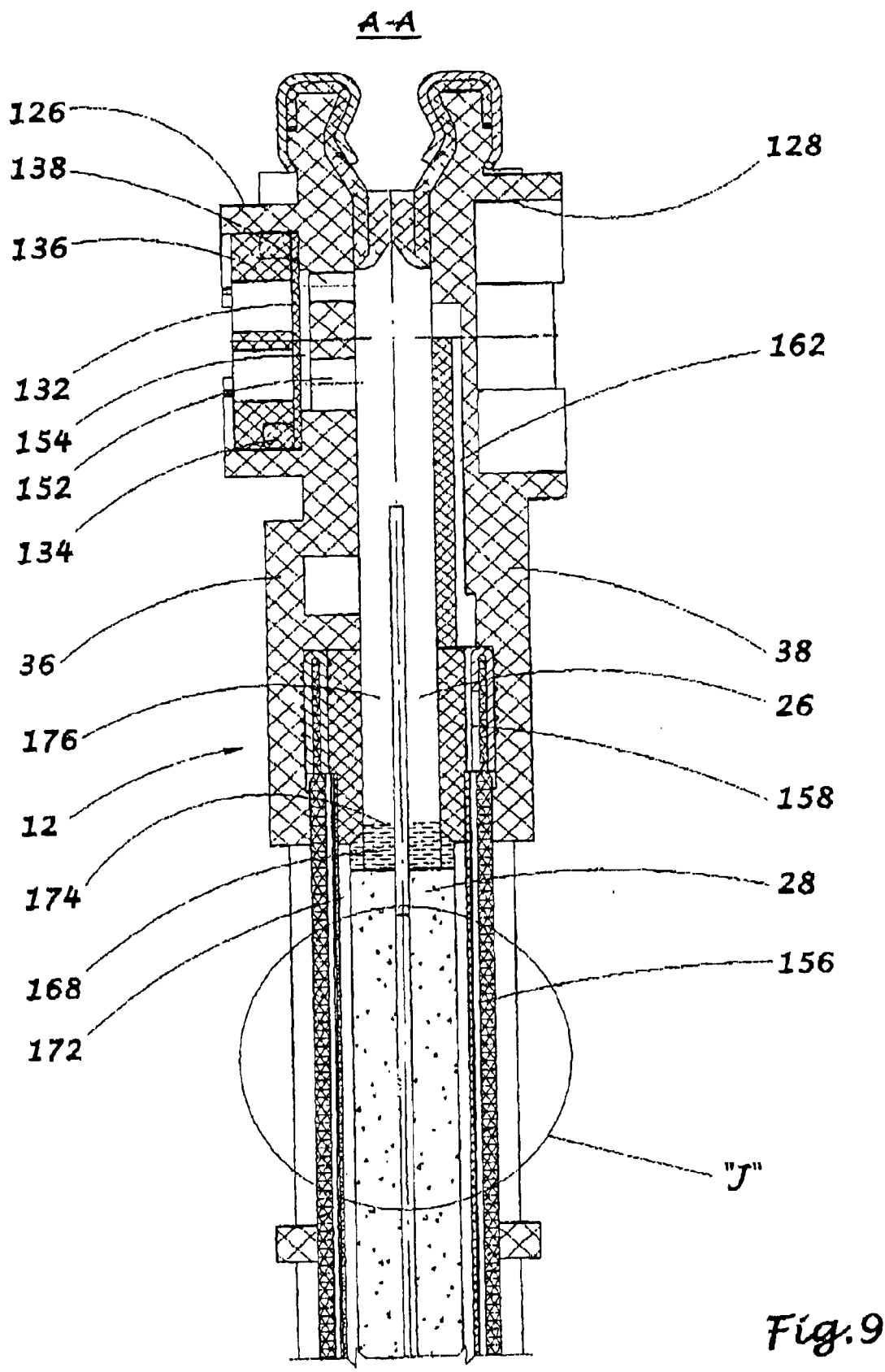
FIG. 9 is a cross-sectional view taken along AA from FIG. 2 to show the gas passage of the cell.

A sheet of semi-permeable membrane 132, a rubber O-ring 134 and a plastic tightening ring 136 are glued into the inner area of the raised cylinder 126. The semi-permeable membrane 132 is gas permeable but liquid impermeable. Such semi-permeable membrane 132 can be made from PTFE or other suitable semi-permeable membrane material. In FIG. 9, a ventilating hole 138 is located at the bottom of the raised cylinder 126; any gas generated inside the metal-gas cell 12 flows out of the metal-gas cell 12 through the ventilating hole 138 and the membrane 132. If any electrolyte enters in the space 154, it flows back to the soft pocket chamber 26 through a communication hole 152.

Figure 10:
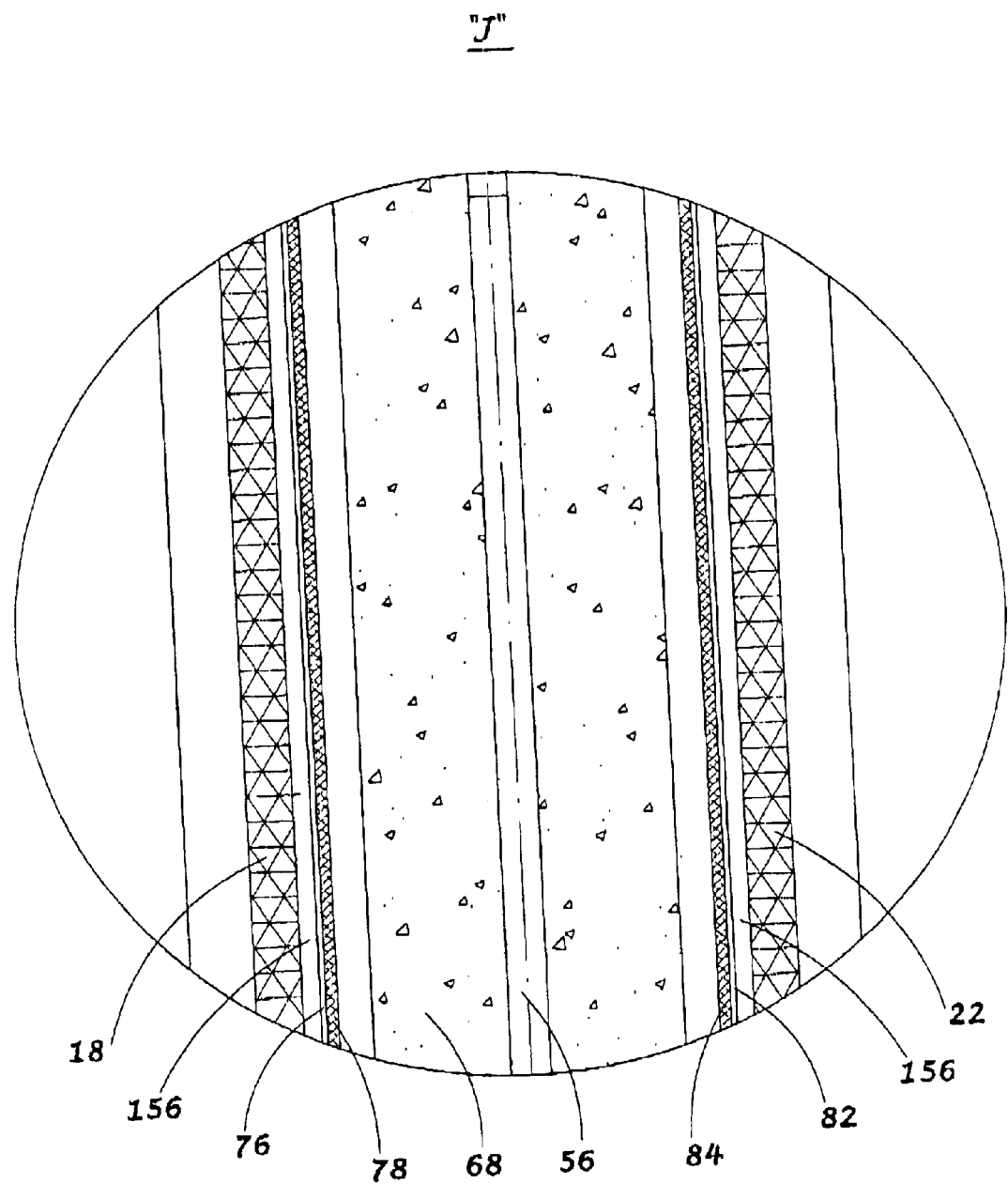
FIG. 10 is a detailed view of encircled area "J" in FIG. 9.

In FIGS. 3 and 10, the separator sheets 76 and 82, made by grafted polyvinyl and manufactured by Century Dragon Co. of the Chinese Nuclear Institute, are permanently installed at a location about 0.3–0.5 mm from the first and the second gas cathodes 18 and 22 in the metal-gas cell 12. Protective meshes 78 and 84, made of, for example, any alkaline-resistant 40–100 mesh fabric, are provided to protect the first and the second gas cathodes 18 and 22 from being destroyed when the metal anode 28 is inserted into and pulled out of the soft pocket chamber 26. Thus, during refueling, the replacement of the metal anode 28 is much more convenient, the separator bags do not need to be changed and washed like in prior arts, and therefore the expensive and labor-intensive operation is eliminated.

FIG. 8 illustrates how the first gas cathode 18 and the second gas cathode 22 are disposed with respect to one another. The first and the second gas cathodes 18 and 22 are any suitable gas cathodes known in the industry. Typical gas cathodes useable in the invention are manufactured by both Eltech Research Corporation and Alupower, Inc. As can be seen, both the first gas cathode 18 and the second gas cathode 22 comprise a wire mesh conductor 164. Laterally disposed current collectors 142 and 144 are disposed along the top edges of the first and the second gas cathodes 18 and 22, respectively. In the embodiment illustrated in the drawings, two pairs of electrical contacts 114 extend from both current collectors 142 and 144. Additionally, a cathode conductor 146 extends from the current collector 144. When the second retaining structure 38 is disposed in the first retaining structure position, each pair of electrical contacts 114 are in physical contact with one another. In this way, the first and the second gas cathodes 18 and 22 are electrically connected to one another. Two pairs of copper elements 148 are clamped onto the sides of the first and the second gas cathodes 18 and 22 to enhance the electrical conductivity.

FIG. 9 illustrates a cross-sectional view taken along AA from FIG. 2. Referring to FIG. 9, any gas in the gap 156 flows up through channel 158 and channel 162 to the upper portion 176 of the soft pocket chamber 26, and then through the ventilating hole 138 and membrane 132 out of the metal-gas cell 12.

FIG. 10 shows the relative positions of the first and the second gas cathodes 18 and 22, separator sheets 76 and 82, and protective meshes 78 and 84 clearly. A gap 156 between the first or the second gas cathodes 18 or 22 and the separator sheets 76 or 82, respectively, is absolutely necessary.

Figure 11:
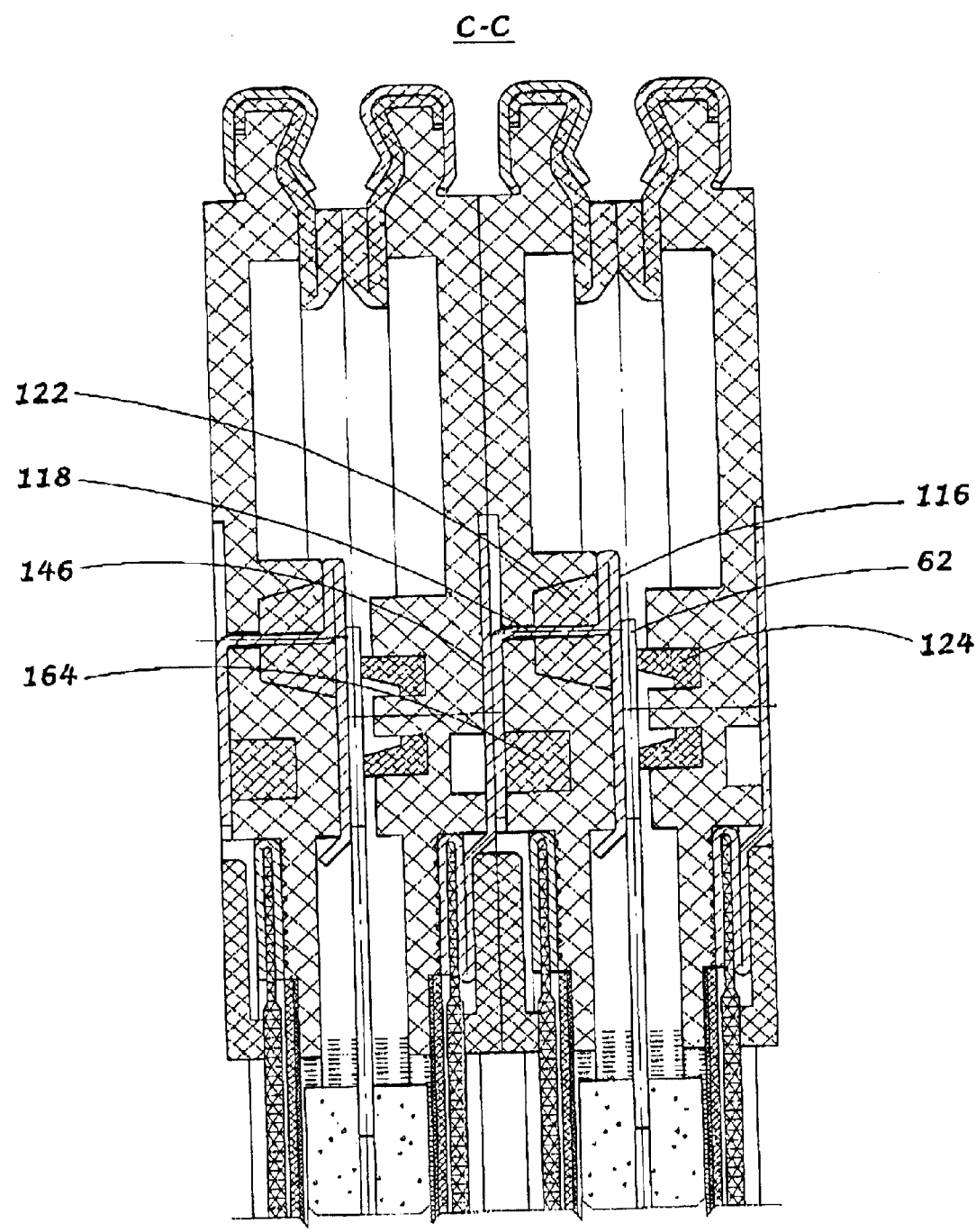
FIG. 11 is a cross-sectional view of two adjacent cells taken along CC from FIG. 2.

FIG. 11 shows two metal-gas cells connected in series. As mentioned before, the elastic element 124 presses the tab portion 62 tightly against the conducting surface 116 of the anode conductor 118. The other end of the anode conductor 118 is tightly pressed against the cathode conductor 146 of the next metal-gas cell so that the metal anode 28 of the first metal-gas cell is connected to the second gas cathode 22 of the next metal-gas cell.

As further illustrated in FIG. 9, the metal-gas cell 12 of the invention operates with an electrolyte 168 disposed within the soft pocket chamber 26. The electrolyte 168 is typically an aqueous solution of potassium hydroxide, sodium hydroxide or sodium chloride. The electrolyte 168 is disposed within a lower portion 172 of the soft pocket chamber 26. That portion of the soft pocket chamber 26 above the liquid level 174 of the electrolyte 168 is referred to herein as the upper portion 176 of the soft pocket chamber 26.

In the embodiment illustrated in the drawings, any gas generated inside the metal-gas cell 12 flows through the semi-permeable membrane 132 to the atmosphere. Thus, the metal-gas cell 12 of this embodiment requires no breathing holes in the cell housing or in the top of the metal anode 28 as is common in prior art metal-gas cell designs. By the design of this embodiment, liquid and mist within the metal-gas cell 12 are wholly contained within the metal-gas cell 12 and are not allowed to leak out from the metal-gas cell 12.

The invention provides a metal-gas cell battery, such as a zinc-air battery, which is suitable for rapid refueling and which is sufficiently durable for hundreds of refueling operations. The invention also provides a metal-gas cell battery, which does not leak electrolyte or electrolyte fumes.

Having thus described the invention. It should be apparent that numerous structural modifications and adaptations may be resorted to without departing from the scope and fair meaning of the instant invention as set forth herein above and as described herein below by the claims.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A metal-gas cell battery comprising (a) at least one metal-gas cell comprising:

a first retaining structure and a second retaining structure aligned parallel, the second retaining structure being moveable with respect to the first retaining structure between a first retaining structure position, wherein the second retaining structure is proximate to the first retaining structure, and a second retaining structure position, wherein the second retaining structure is spaced apart from the first retaining structure;

a first gas cathode disposed within the first retaining structure, the first gas cathode being permeable to gases but impermeable to liquids, the first gas cathode allowing the passage of gases into the cell;

a second gas cathode disposed within the second retaining structure, the second gas cathode being permeable to air but impermeable to liquids, the second gas cathode allowing the passage of gases into the cell, and the second gas cathode being electrically connected to the first gas cathode;

a soft pocket disposed between the first gas cathode and the second gas cathode, the soft pocket having a flexible and planar first wall and a flexible and planar second wall, a periphery of the first wall including a top edge, a periphery of the second wall including a top edge, the periphery of the first wall being connected to the periphery of second wall except along the respective top edges, the periphery of the first wall being attached to the first retaining structure and the periphery of the second wall being attached to the second retaining structure, whereby the first retaining structure, the first gas cathode, the first wall, the second wall, the second retaining structure and the second gas cathode cooperate to define a liquid retaining soft pocket chamber having a lower portion, an upper portion and a top opening defined between the top edges of the first and the second walls, the top opening being open when the first and the second retaining structures are in the second retaining structure position and tightly closed when the first and the second retaining structures are in the first retaining structure position;

a soft pocket closing mechanism for securing the first and the second retaining structures in the first retaining structure position;

a metal anode disposed within the soft pocket chamber;

a first protective mesh disposed between the first gas cathode and the first wall of the soft pocket, and a second protective mesh disposed between the second gas cathode and the second wall of the soft pocket; and a first separator sheet is permanently installed between the first gas cathode and the first protective mesh, and a second separator sheet is permanently installed between the second gas cathode and the second protective mesh; and (b) a positive battery terminal electrically connected to the first and the second gas cathodes; and (c) a negative battery terminal electrically connected to the metal anode.

2. The metal-gas cell battery of claim 1, wherein the metal-gas cell further comprises an electrolyte disposed within the soft pocket chamber.

3. The metal-gas cell battery of claim 2, wherein the electrolyte is an aqueous solution containing a compound selected from the group consisting of potassium hydroxide, sodium hydroxide and sodium chloride.

4. The metal-gas cell battery of claim 2, wherein the electrolyte is an aqueous solution containing potassium hydroxide.

5. The metal-gas cell battery of claim 1, wherein a semi-permeable membrane is disposed in the upper portion of the soft pocket chamber to allow gases to flow out of the upper portion, the semi-permeable membrane being permeable to gases but being impermeable to liquids.

6. The metal-gas cell battery of claim 5, wherein the semi-permeable membrane is made of PTFE.

7. The metal-gas cell battery of claim 1, wherein the soft pocket closing mechanism comprises at least one bolt and at least one nut.

8. The metal-gas cell battery of claim 1, wherein the metal anode is wholly disposed within the soft pocket chamber.

9. The metal-gas cell battery of claim 1, wherein the metal anode comprises a planar anode base portion and a tab portion.

10. The metal-gas cell battery of claim 8, wherein the anode base portion is disposed without an enclosure separator bag.

11. The metal-gas cell battery of claim 9, wherein the anode base portion has a lower edge and an upper edge, the lower edge of the anode base portion being shorter in length than the upper edge of the anode base portion.

12. The metal-gas cell battery of claim 10, wherein the anode base portion is trapezoidal in shape.

13. The metal-gas cell battery of claim 1, wherein the metal anode comprises an electrically conductive support structure to which is attached a metal anode material.

14. The metal-gas cell battery of claim 12, wherein the metal anode material is zinc.

15. The metal-gas cell battery of claim 1, wherein the first and the second gas cathodes are a first and a second air cathodes, respectively.

16. The metal-gas cell battery of claim 1, wherein the metal anode is retained firmly within the soft pocket by elastic elements when the first and the second retaining structures are in the first retaining structure position.

17. The metal-gas cell battery of claim 15, wherein the elastic elements are disposed within the second retaining structure.

18. The metal-gas cell battery of claim 1, wherein the soft pocket comprises a molded integral piece M-shaped in cross section.

19. The metal-gas cell battery of claim 17, wherein the soft pocket is made of neoprene, ethylene propylene diene monomer, butyl rubber, ethylene propylene copolymer, or chlorosulfonated polyethylene.

20. The metal-gas cell battery of claim 1, wherein the first and the second separator sheets are permanently installed at about 0.3–0.5 mm respectively from the first and the second gas cathodes in the metal-gas cell.

21. The metal-gas cell battery of claim 1, wherein the first and the second protective meshes are alkaline resistant.

22. The metal-gas cell battery of claim 20, wherein the first and second protective meshes are 40–300 mesh.

23. The metal-gas cell battery of claim 20, wherein the first and second protective meshes are 80–100 mesh.

24. The metal-gas cell battery of claim 1 comprising a plurality of metal-gas battery cells.

25. The metal-gas cell battery of claim 24, wherein the metal-gas cells are electrically connected in series.

26. The metal-gas cell battery of claim 1 comprising a plurality of internal metal-gas cells sandwiched between a first outermost metal-gas cell and a second outermost metal-gas call, the tab portion of the metal anode in each of the internal metal-gas cells being electrically connected to the gas cathodes of an adjoining metal-gas cell by a conductor member, the conductor member having a portion which is in abutment with the tab portion of the metal anode.

27. The metal-gas cell battery of claim 1, wherein the periphery of the first wall of the soft pocket is attached to the first retaining structure and the periphery of the second wall of the soft pocket is attached to the second retaining structure, by mechanical force without glue.

28. A zinc-air cell battery comprising:

(a) a plurality of internal zinc-air cells sandwiched between a first outermost zinc-air cell and a second outermost zinc-air cell, each zinc-air cell comprising:

a first retaining structure and a second retaining structure aligned parallel, the second retaining structure being moveable with respect to the first retaining structure between a first retaining structure position, wherein the second retaining structure is proximate to the first retaining structure, and a second retaining structure position, wherein the second retaining structure is spaced apart from the first retaining structure;

a first air cathode disposed within the first retaining structure, the first air cathode being permeable to gases but impermeable to liquids, the first air cathode allowing the passage of gases into the cell;

a second air cathode disposed within the second retaining structure, the second air cathode being permeable to air but impermeable to liquids, the second air cathode allowing the passage of gases into the cell, and the second air cathode being electrically connected to the first air cathode;

a soft pocket disposed between the first air cathode and the second air cathode, the soft pocket having a flexible and planar first wall and a flexible and planar second wall, a periphery of the first wall having a top edge, a periphery of the second wall having a top edge, the periphery of the first wall being connected to the periphery of the second wall except along the respective top edges, the periphery of the first wall being attached to the first retaining structure and the periphery of the second wall being attached to the second retaining structure, whereby the first retaining structure, the first air cathode, the first wall, the second wall, the second retaining structure and the second air cathode cooperate to define a liquid retaining soft pocket chamber having a lower portion, an upper portion and a top opening defined between the top edges of the first and the second walls, the top opening being open when the first and the second retaining structures are in the second retaining structure position and tightly closed when the first and the second retaining structures are in the first retaining structure position;

a soft pocket closing mechanism for securing the first and the second retaining structures in the first retaining structure position;

a zinc anode wholly disposed within the soft pocket chamber, the zinc anode comprising a planar anode base portion and a tab portion, the anode base portion having a lower edge and an upper edge, the lower edge of the anode base portion being shorter in length than the upper edge of the anode base portion;

a first protective mesh disposed between the first air cathode and the first wall of the soft pocket, and a second protective mesh disposed between the second air cathode and the second wall of the soft pocket;

a first separator sheet is permanently installed between the first air cathode and the first protective mesh, and a second separator sheet is permanently installed between the second air cathode and the second protective mesh; and a semi-permeable membrane disposed in the upper portion of the soft pocket chamber to allow gases to flow out of the upper portion, the semi-permeable membrane being permeable to gases but being impermeable to liquids; and (b) a positive battery terminal electrically connected to the first and the second air cathodes of the first outermost zinc-air cell; and (c) a negative battery terminal electrically connected to the zinc anode of the second outermost zinc-air cell, wherein the tab portion of the zinc anode in each internal zinc-air cell is electrically connected to the air cathodes of an adjoining zinc-air cell by a conductor member, the conductor member having a portion which is in abutment with the tab portion of the zinc anode.

29. The zinc-air cell battery of claim 28, wherein each zinc-air cell further comprises an electrolyte disposed within the soft pocket chamber.

30. The zinc-air cell battery of claim 29, wherein the electrolyte is an aqueous solution containing a compound selected from the group consisting of potassium hydroxide, sodium hydroxide and sodium chloride.

31. The zinc-air cell battery of claim 29, wherein the electrolyte is an aqueous solution containing potassium hydroxide.

32. The zinc-air cell battery of claim 28, wherein the semi-permeable membrane in each zinc-air cell is made of PTFE.

33. The zinc-air cell battery of claim 28, wherein the soft pocket closing mechanism in each zinc-air cell comprises at least one bolt and at least one nut.

34. The zinc-air cell battery of claim 28, wherein the anode base portion in each zinc-air cell is disposed without an enclosure separator bag.

35. The zinc-air cell battery of claim 28, wherein the anode base portion in each zinc-air cell is trapezoidal in shape.

36. The zinc-air cell battery of claim 28, wherein the zinc anode in each zinc-air cell comprises an electrically conductive support structure to which is attached a zinc anode material.

37. The zinc-air cell battery of claim 28, wherein the zinc anode is retained firmly within the soft pocket by elastic elements when the first and the second retaining structures in each zinc-air cell are in the first retaining structure position.

38. The zinc-air cell battery of claim 37, wherein the elastic elements in each zinc-air cell are disposed within the second retaining structures.

39. The zinc-air cell battery of claim 28, wherein the plurality of zinc-air cells are electrically connected in series.

40. The zinc-air cell battery of claim 28, wherein the soft pocket comprises a molded integral piece M-shaped in cross section.

41. The zinc-air cell battery of claim 28, wherein the soft pocket is made of neoprene, ethylene propylene diene monomer, butyl rubber, ethylene propylene copolymer, or chlorosulfonated polyethylene.

42. The zinc-air cell battery of claim 28, wherein the first and the second separator sheets are permanently installed at about 0.3–0.5 mm respectively from the first and the second air cathodes in the zinc-air cell.

43. The zinc-air battery of claim 42, wherein the first and the second protective meshes are alkaline resistant.

44. The zinc-air cell battery of claim 43, wherein the first and second protective meshes are 40–300 mesh.

45. The zinc-air cell battery of claim 43, wherein the first and second protective meshes are 80–100 mesh.

46. The zinc-air cell battery of claim 28, wherein the periphery of the first wall of the soft pocket is attached to the first retaining structure and the periphery of the second wall of the soft pocket is attached to the second retaining structure, by mechanical force without glue.

47. A metal-gas cell comprising:

a first retaining structure and a second retaining structure aligned parallel, the second retaining structure being moveable with respect to the first retaining structure between a first retaining structure position, wherein the second retaining structure is proximate to the first retaining structure, and a second retaining structure position, wherein the second retaining structure is spaced apart from the first retaining structure;

a first gas cathode disposed within the first retaining structure, the first gas cathode being permeable to gases but impermeable to liquids, and the first gas cathode allowing the passage of gases into the cell;

a second gas cathode disposed within the second retaining structure, the second gas cathode being permeable to air but impermeable to liquids, the second gas cathode allowing the passage of gases into the cell, and the second gas cathode being electrically connected to the first gas cathode;

a soft pocket disposed between the first and the second gas cathodes, the soft pocket having a first wall and a second wall, the peripheral edges of the first wall connecting the peripheral edges of the second wall except the top edges of the first and the second walls, the peripheral edges of the first and the second walls respectively attaching to the first and the second retaining structures to define a soft pocket chamber for retaining a liquid, the soft pocket chamber having a lower portion, an upper portion and a top opening defined between the top edges of the first and the second walls, the top opening being open when the first and the second retaining structures are in the second retaining structure position and tightly closed when the first and the second retaining structures are in the first retaining structure position;

a soft pocket closing mechanism for securing the first and the second retaining structures in the first retaining structure position;

a metal anode disposed within the soft pocket chamber;

a first protective mesh disposed between the first gas cathode and the first wall of the soft pocket, and a second protective mesh disposed between the second gas cathode and the second wall of the soft pocket; and a first separator sheet is permanently installed between the first gas cathode and the first protective mesh, and a second separator sheet is permanently installed between the second gas cathode and the second protective mesh.

48. The metal-gas cell of claim 47 further comprising an electrolyte within the soft pocket chamber.

49. The metal-gas cell of claim 48, wherein the electrolyte is an aqueous solution containing a compound selected from a group consisting of potassium hydroxide, sodium hydroxide and sodium chloride.

50. The metal-gas cell of claim 48, wherein the electrolyte is an aqueous solution containing potassium hydroxide.

51. The metal-gas cell of claim 47, wherein a semi-permeable membrane is disposed in the upper portion of the soft pocket chamber to allow gases to flow out from the upper portion, the semi-permeable membrane being permeable to gases but being impermeable to liquids.

52. The metal-gas cell of claim 51, wherein the semi-permeable membrane is made of PTFE.

53. The metal-gas cell of claim 47, wherein the soft pocket closing mechanism comprises at least one bolt and at least one nut.

54. The metal-gas cell of claim 47, wherein the metal anode is wholly disposed within the soft pocket chamber.

55. The metal-gas cell of claim 47, wherein the metal anode comprises a planar anode base portion and a tab portion.

56. The metal-gas cell of claim 55, wherein the planar anode base portion is disposed without being enclosed by a separator bag.

57. The metal-gas cell of claim 55, wherein the planar anode base portion has a lower edge and an upper edge, and the lower edge is shorter in length than the upper edge.

58. The metal-gas cell of claim 57, wherein the planar anode base portion is trapezoidal in shape.

59. The metal-gas cell of claim 47, wherein the metal anode comprises a conductive support structure packed with a metal anode material.

60. The metal-gas cell of claim 59, wherein the metal anode material is zinc.

61. The metal-gas cell of claim 47, wherein the first and the second gas cathodes are a first and a second air cathodes, respectively.

62. The metal-gas cell of claim 47, wherein the metal anode is retained firmly within the soft pocket by elastic elements when the first and the second retaining structures are in the first retaining structure position.

63. The metal-gas cell of claim 62, wherein the elastic elements are disposed within the second retaining structure.

64. The metal-gas cell of claim 47, wherein the soft pocket comprises a molded integral piece M-shaped in cross section.

65. The metal-gas cell of claim 64, wherein the soft pocket is made of a material selected from a group consisting of neoprene, ethylene propylene diene monomer, butyl rubber, ethylene propylene copolymer, and chlorosulfonated polyethylene.

66. The metal-gas cell of claim 47, wherein the first and the second separator sheets are permanently installed at about 0.3–0.5 mm respectively from the first and the second gas cathodes in the metal-gas cell.

67. The metal-gas cell of claim 47, wherein the first and the second protective meshes are alkaline resistant.

68. The metal-gas cell of claim 67, wherein the first and second protective meshes are 40–300 mesh.

69. The metal-gas cell of claim 67, wherein the first and second protective meshes are 80–100 mesh.

70. The metal-gas cell of claim 47, wherein the peripheral edges of the first and the second walls of the soft pocket respectively attaching to the first and the second retaining structures by mechanical force without glue.

* * * * *